US008024886B2

(12) United States Patent
Sutherland et al.

(10) Patent No.: US 8,024,886 B2
(45) Date of Patent: Sep. 27, 2011

(54) ADJUSTABLE ROD HOLDER

(76) Inventors: Scott Sutherland, Hood River, OR (US);
Blake Richards, Hood River, OR (US);
Dennis Dekruyf, Hood River, OR (US)

(*) Notice: Subject to any disclaimer, the term of this patent is extended or adjusted under 35 U.S.C. 154(b) by 237 days.

(21) Appl. No.: 11/824,970

(22) Filed: Jul. 2, 2007

(65) Prior Publication Data
US 2008/0134565 A1 Jun. 12, 2008

Related U.S. Application Data

(60) Provisional application No. 60/874,410, filed on Dec. 11, 2006.

(51) Int. Cl.
A01K 97/10 (2006.01)
(52) U.S. Cl. .......... 43/21.2; 248/514; 248/523; 248/538
(58) Field of Classification Search ............ 43/21.2; 248/514–516, 523, 538
See application file for complete search history.

(56) References Cited

U.S. PATENT DOCUMENTS

| 278,973 | A | * | 6/1883 | Kizer | 248/514 |
|---|---|---|---|---|---|
| 358,527 | A | * | 3/1887 | Zwoyer et al. | 248/514 |
| 735,454 | A | * | 8/1903 | Bradbury | 248/516 |
| 977,835 | A | * | 12/1910 | Piscator | 43/21.2 |
| 1,020,846 | A | * | 3/1912 | Rauch | 248/514 |
| 1,025,657 | A | * | 5/1912 | Towne | 43/21.2 |
| 1,256,191 | A | * | 2/1918 | Wittkowski | 43/21.2 |
| 1,285,218 | A | * | 11/1918 | Kershaw | 248/516 |
| 1,410,798 | A | * | 3/1922 | Cowdery | 248/517 |
| 1,459,438 | A | * | 6/1923 | Brand | 43/21.2 |
| 1,534,642 | A | * | 4/1925 | Hoagland | 248/514 |
| 1,789,509 | A | * | 1/1931 | Bergstrom | 248/516 |
| 1,985,985 | A | * | 1/1935 | Gerline | 43/21.2 |
| 2,249,302 | A | * | 7/1941 | Smith | 43/21.2 |
| 2,311,823 | A | * | 2/1943 | Gaskill | 43/21.2 |
| 2,314,747 | A | * | 3/1943 | White | 43/21.2 |
| 2,430,112 | A | * | 11/1947 | Hamre | 43/21.2 |
| 2,454,458 | A | * | 11/1948 | Kaetker | 248/514 |
| 2,458,881 | A | * | 1/1949 | Steuer | 248/514 |
| 2,479,055 | A | * | 8/1949 | Bzur | 43/21.2 |
| 2,481,272 | A | * | 9/1949 | Williams | 248/514 |
| 2,523,356 | A | * | 9/1950 | Cherry | 43/21.2 |
| 2,552,639 | A | * | 5/1951 | Menegay | 248/516 |
| 2,553,231 | A | * | 5/1951 | Bayto | 248/534 |
| 2,580,130 | A | * | 12/1951 | Rowdon | 43/21.2 |
| 2,606,731 | A | * | 8/1952 | Harris | 43/21.2 |
| 2,621,877 | A | * | 12/1952 | Grigsby | 43/21.2 |

(Continued)

FOREIGN PATENT DOCUMENTS

DE 10223628 A1 * 12/2003

(Continued)

Primary Examiner — Darren W Ark

(57) ABSTRACT

The invention is an adjustable rod holder comprising a tubular holster mounted to an arm and a base, wherein the arm is secured to the base by a rotating joint that is secured in a first angular position by a locking member that moves radially with respect to an axle of the rotating joint. The rotating joint can be releasably secured at a plurality of indexed angular positions by the locking member fitting within a plurality of recesses spaced radially about an axle of the rotating joint. Preferably, the arm of the rod holder has a sufficient length to allow the rod holder to store the rod in a vertical position without interference from the gunnel or other mounting surface. In one embodiment, the rod holder has a pivoting stabilizer that engages the reel of a rod placed in the holder to secure and stabilize the system.

21 Claims, 10 Drawing Sheets

U.S. PATENT DOCUMENTS

| | | | | |
|---|---|---|---|---|
| 2,693,660 | A | * | 11/1954 | Nebergall et al. ............. 43/21.2 |
| 2,704,412 | A | * | 3/1955 | Davis ............................. 43/21.2 |
| 2,835,066 | A | * | 5/1958 | Spilker .......................... 43/21.2 |
| 2,851,234 | A | * | 9/1958 | Scheifele ....................... 248/538 |
| 2,884,213 | A | * | 4/1959 | Hiering ......................... 248/515 |
| 3,006,588 | A | * | 10/1961 | Lemi ............................. 248/515 |
| 3,008,259 | A | * | 11/1961 | Zornes ........................... 248/515 |
| 3,010,687 | A | * | 11/1961 | Hagberg ........................ 248/515 |
| 3,014,679 | A | * | 12/1961 | Jepson ............................. 43/15 |
| 3,063,668 | A | * | 11/1962 | Yohe .............................. 43/21.2 |
| 3,162,408 | A | * | 12/1964 | Markman ...................... 248/515 |
| 3,191,898 | A | * | 6/1965 | McCullough ................. 248/514 |
| 3,319,911 | A | * | 5/1967 | Fuller ............................ 248/514 |
| 3,453,765 | A | * | 7/1969 | Gibbons ......................... 43/21.2 |
| 3,516,190 | A | * | 6/1970 | Cook .............................. 43/21.2 |
| 3,564,753 | A | * | 2/1971 | Fravel ............................ 43/21.2 |
| 3,570,793 | A | * | 3/1971 | Shackel .......................... 43/21.2 |
| 3,708,141 | A | * | 1/1973 | Friedgen et al. .............. 248/515 |
| 3,747,881 | A | * | 7/1973 | Akamu ........................... 43/21.2 |
| 3,750,918 | A | * | 8/1973 | Jensen ............................ 43/21.2 |
| 3,906,653 | A | * | 9/1975 | Williams ........................ 43/21.2 |
| 4,142,315 | A | * | 3/1979 | Hoffman ........................... 43/15 |
| 4,198,775 | A | * | 4/1980 | Leisner ........................... 43/21.2 |
| 4,407,089 | A | * | 10/1983 | Miller ............................. 43/21.2 |
| 4,551,939 | A | * | 11/1985 | Kitchens ......................... 43/21.2 |
| 4,586,688 | A | * | 5/1986 | Hartman et al. ................ 43/21.2 |
| 4,807,384 | A | * | 2/1989 | Roberts, Sr. .................... 43/21.2 |
| 4,827,654 | A | * | 5/1989 | Roberts .......................... 43/21.2 |
| 4,932,152 | A | * | 6/1990 | Barlotta et al. ................. 43/21.2 |
| 5,054,737 | A | * | 10/1991 | DeLancey ....................... 43/21.2 |
| 5,121,565 | A | * | 6/1992 | Wille et al. ..................... 43/21.2 |
| 5,142,809 | A | * | 9/1992 | O'Brien et al. ................. 43/21.2 |
| 5,184,797 | A | * | 2/1993 | Hurner ........................... 43/21.2 |
| 5,231,785 | A | * | 8/1993 | Roberts .......................... 43/21.2 |
| 5,280,871 | A | * | 1/1994 | Chuang ......................... 248/516 |
| 5,313,734 | A | * | 5/1994 | Roberts .......................... 43/21.2 |
| 5,367,815 | A | * | 11/1994 | Liou ............................... 43/21.2 |
| 5,438,789 | A | * | 8/1995 | Emory ............................ 43/21.2 |
| 5,501,028 | A | * | 3/1996 | Hull et al. ...................... 43/21.2 |
| 5,724,763 | A | * | 3/1998 | Rasmussen ..................... 43/21.2 |
| 5,761,844 | A | * | 6/1998 | Horschel ........................ 43/21.2 |
| 5,871,196 | A | * | 2/1999 | Martelli ......................... 43/21.2 |
| 6,302,367 | B1 | * | 10/2001 | Ratza et al. .................... 43/21.2 |
| 6,357,166 | B1 | * | 3/2002 | Malmanger et al. ........... 43/21.2 |
| 6,421,948 | B1 | * | 7/2002 | Craig .............................. 43/21.2 |
| 6,591,541 | B1 | * | 7/2003 | Cummings ..................... 43/21.2 |
| 6,941,694 | B2 | * | 9/2005 | Ernst .............................. 43/21.2 |
| 6,974,113 | B1 | * | 12/2005 | Clark et al. .................... 248/538 |
| 6,978,570 | B1 | * | 12/2005 | Clark et al. ..................... 43/21.2 |
| 7,007,906 | B2 | * | 3/2006 | Slatter ............................ 43/21.2 |
| 7,114,281 | B2 | * | 10/2006 | Miller ............................. 43/21.2 |
| 7,296,377 | B2 | * | 11/2007 | Wilcox et al. .................. 43/21.2 |
| D564,062 | S | * | 3/2008 | Carnevali ..................... D22/147 |
| 7,387,284 | B2 | * | 6/2008 | Chang ........................... 248/516 |
| D573,685 | S | * | 7/2008 | Marcus ......................... D22/147 |
| D573,686 | S | * | 7/2008 | Marcus ......................... D22/147 |
| D574,920 | S | * | 8/2008 | Marcus ......................... D22/147 |
| 7,406,795 | B1 | * | 8/2008 | Follmar ......................... 43/21.2 |
| 7,774,973 | B2 | * | 8/2010 | Carnevali ....................... 43/21.2 |
| 7,849,630 | B2 | * | 12/2010 | Carnevali ....................... 43/21.2 |
| 2006/0102822 | A1 | * | 5/2006 | Liang ............................ 248/514 |
| 2006/0260174 | A1 | * | 11/2006 | Crowe et al. ................... 43/21.2 |
| 2007/0119089 | A1 | * | 5/2007 | Nicholson ...................... 43/21.2 |
| 2008/0053361 | A1 | * | 3/2008 | Nicholson .................... 248/514 |
| 2008/0155881 | A1 | * | 7/2008 | Carnevali ....................... 43/21.2 |
| 2009/0084019 | A1 | * | 4/2009 | Carnevali ....................... 43/21.2 |
| 2009/0211141 | A1 | * | 8/2009 | Marcus .......................... 43/21.2 |
| 2010/0083557 | A1 | * | 4/2010 | Stanton .......................... 43/21.2 |

FOREIGN PATENT DOCUMENTS

| | | | |
|---|---|---|---|
| JP | 04084843 | A * | 3/1992 |
| JP | 0829899 | A * | 11/1996 |
| JP | 2001008596 | A * | 1/2001 |
| JP | 2006158360 | A * | 6/2006 |
| JP | 2007028989 | A * | 2/2007 |
| JP | 2007061044 | A * | 3/2007 |
| JP | 2007236349 | A * | 9/2007 |

* cited by examiner

ADJUSTABLE ROD HOLDER

RELATED APPLICATIONS

This application is a continuation-in-part of U.S. Provisional Patent Application Ser. No. 60/874,410, filed Dec. 11, 2006.

FIELD OF THE PRESENT INVENTION

This invention relates generally to fishing accessories. More particularly, this invention relates to an improved fishing rod holder, which preferably can be used with a universal mounting system.

BACKGROUND OF THE INVENTION

The invention and its relation to the prior art can best be understood in relation to the design of a conventional fishing rod and top-mounted casting reel combination. As shown in FIG. 1, a fishing rod 10 (partially shown) has a series of eyelets 12 used to guide a fishing line 14 from the reel 16 to the end of rod 10. The butt 18 of fishing rod 10 is equipped with fore and aft grips 20 and 22, respectively, to facilitate holding the rod and to provide good leverage. Rod 10 may also be equipped with a trigger 24 to help the user hold the rod.

Fishing rod holders generally serve to secure a fishing rod and reel combination in a position that allows the system to maintain the fishing line, the bait or lure and hook in the water without requiring the active participation of the user. Often, the fishing rod holder is designed to allow the user to quickly take over control of the rod and reel when a fish takes the hook. Despite these general goals, there are numerous types of fishing rods and reels, as well as many different fishing styles and applications. As a result, there are a wide variety of prior art fishing rod holders that employ various strategies to secure and stabilize the rod.

One type of rod holder is disclosed in U.S. Pat. No. 5,313,734 to Roberts et al. and FIG. 2 is an illustration of a prior art rod holder of this category. As can be seen, this type of rod holder 30 generally comprises a cylindrical holster 32 that is configured to receive the butt of the fishing rod equipped with a top-mounted casting reel and may be attached in any convenient manner to a boat. In this design, the aft portion 34 of holster 32 is cut away to allow the rod to be quickly tilted up and then withdrawn, if desired. To secure the rod, the fore portion 35 of holster 32 comprises a rotating locking ring 36, which can encircle the rod. When rotated to the open position, the rod may be inserted and withdrawn from holder 30. Prior art holder 30 also features scalloped areas 38 to provide clearance for the reel.

Although the holder shown in FIG. 2 functions adequately for its intended purpose, it suffers from a number of drawbacks. One feature that is often desirable for a rod holder is the ability to change the angle of the holder with respect to the water. For example, a variety of angles may be appropriate depending upon the type of trolling being performed. Also, it can be convenient to provide a substantially vertical orientation as a storage position.

Conventional rod holders that attempt to provide adjustable angle typically provide a pivoting axle adjacent holster 32. Often, the adjustment mechanism consists of a screw knob that is used to increase the friction between the pivoting members to the point where the rod holder will remain at the desired angle. As can be appreciated, constantly tightening and untightening the screw knob is cumbersome and inconvenient. Further, it is common for the joint to slip when load is placed on the rod. To help increase the friction and lock in a given angle, some designs employ a series of ribs along the faces of the joint. However, these do not provide a very robust locking feature and are prone to wear.

Another drawback associated with conventional rod holders having adjustable angle is that they are typically unable to assume a substantially vertical orientation. Specifically, the butt 18 of the rod does not clear most mounting locations, such as the boat gunnel, when the holder is positioned in a vertical orientation. This forces the user to remove the rod from the holder and store it in another location or else leave it in place and contend with the tip of the rod projecting from the side of the boat and the butt of the rod projecting into the working area of the boat.

Yet another drawback it that conventional rod holders rarely engage a given rod and reel combination optimally. The problem stems from the wide variety of rod and reel combinations that rod holders are expected to accommodate.

Preferably, the rod holder primarily engages the rod at two positions, at the fore and aft grip regions, as these are the areas of the rod that are designed to withstand load. Further, the rod holder should also support the reel to stabilize it in a top-oriented position and resist longitudinal movement of the rod and reel combination. Although supported, the reel should not receive the brunt of the loading forces transmitted from the rod holder to the rod, since the reel and its attachment to the road are not designed with such forces in mind. Thus, the rod and reel combination must fit prior art rod holders quite closely to achieve optimized interactions at these three areas.

Unfortunately, as one of skill in the art will appreciate, the size and placement of the reel can differ substantially, as can the diameter of the rod, the rod grips and the size and position or presence of the trigger. Given these variations, most rod and reel combinations will not fit a given rod holder in the optimal manner described above. Further, conventional rod holders generally are not designed to adjust to varying rod and reel combinations. As a result, prior art rod holders fail to secure and stabilize most rod and reel combinations in the best manner.

In practice, one of two deficiencies result. In the first case, the scalloped regions 38 of the rod holder do not provide adequate relief, preventing the rod from securely contacting the holster at either the fore or aft region, which causes an undesirable point load to be transmitted to the reel. Alternatively, the scalloped regions 38 provide too much clearance, leaving the reel unsupported so that the rod can rotate axially and be displaced longitudinally, generally providing a sloppy fit.

Accordingly, what has been needed is an adjustable rod holder that quickly and securely positions a rod at a desired angle. What has also been needed is a rod holder that is capable of accommodating a wide variety of rod and reel combinations, while engaging the rod at the main fore and aft grips and simultaneously supporting the reel. This invention satisfies these and other needs.

SUMMARY OF THE INVENTION

In accordance with the above objects and those that will be mentioned and will become apparent below, the present invention is an adjustable rod holder comprising a tubular holster mounted to an arm and a base, wherein the arm is secured to the base by a rotating joint that is secured in a first angular position by a locking member that moves radially with respect to an axle of the rotating joint. Preferably, the rotating joint can be releasably secured at a plurality of indexed angular positions. In the noted embodiment, the rotating joint can be releasably secured at an indexed position by the locking member that fits within a plurality of recesses spaced radially about an axle of the rotating joint.

In one embodiment of the invention, the rod holder has a trigger release that disengages the locking member and allows the rotating joint to pivot freely. Preferably, actuation of the trigger release withdraws the engaging member from one of the plurality of recesses in a direction perpendicular to the axis of the rotating joint.

In one aspect of the invention, at least one of the plurality of recesses exhibits a tapered profile. Preferably, the locking member has a wedge shaped profile configured to mate with the tapered profile of the recess. Also preferably, at least one of the plurality of recess is defined by opposing faces and one of the opposing faces has a negative rake angle. In such embodiments, it is preferred that one of the opposing faces of the recess has a positive rake angle with a greater absolute value than the absolute value of the negative rake angle.

In one embodiment of the invention, the arm is configured to allow a rod secured within the rod holder to be positioned vertically when the rod holder is mounted to a gunnel. Preferably, the arm has a length in the range of approximately 5 cm to 20 cm.

In another embodiment of the invention, the base further comprises a lower portion that is substantially cylindrical and has an outer diameter configured to be received by an interior diameter of a barrel of a univeral mount. In such embodiments, the lower portion preferably has a plurality of splines aligned with a longitudinal axis of the lower portion and the splines are configured to interlock with a plurality of splines disposed around the interior diameter of the barrel of the universal mount.

In another aspect of the invention, the tubular holster has an aft portion and a fore portion configured to secure a fishing rod and a pivoting stabilizer, wherein the aft portion has a bottom openings and the fore portion has a top opening that allow the fishing rod positioned in the rod holder to pivot upwards and wherein the pivoting stabilizer is configured to contact and support a reel secured to the rod when the rod is positioned in the rod holder. Preferably, the pivoting stabilizer has opposing curved portions configured to conform to a diameter of the reel. Alternatively, the pivoting stabilizer has opposing flat portions configured to conform to a housing of the reel and the flat portions are preferably configured to be substantially parallel to a longitudinal axis of the holster when the pivoting stabilizer is in a depressed position.

In one embodiment of the invention, the pivoting stabilizer is elastically biased in an upwards direction. Preferably, the pivoting stabilizer exhibits a range of travel at a location where the stabilizer contacts the reel in the range of approximately 15 to 25 mm, and more preferably approximately 19 mm.

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

Figure 1:
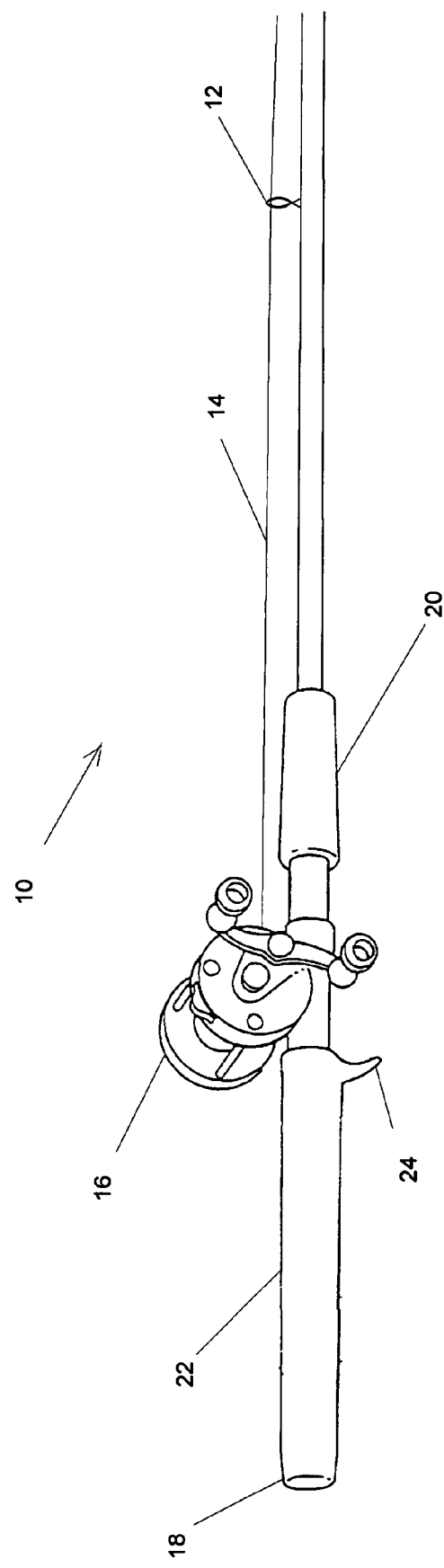
FIG. 1 is an elevational view of a conventional rod and reel combination as known in the art.
Figure 3:
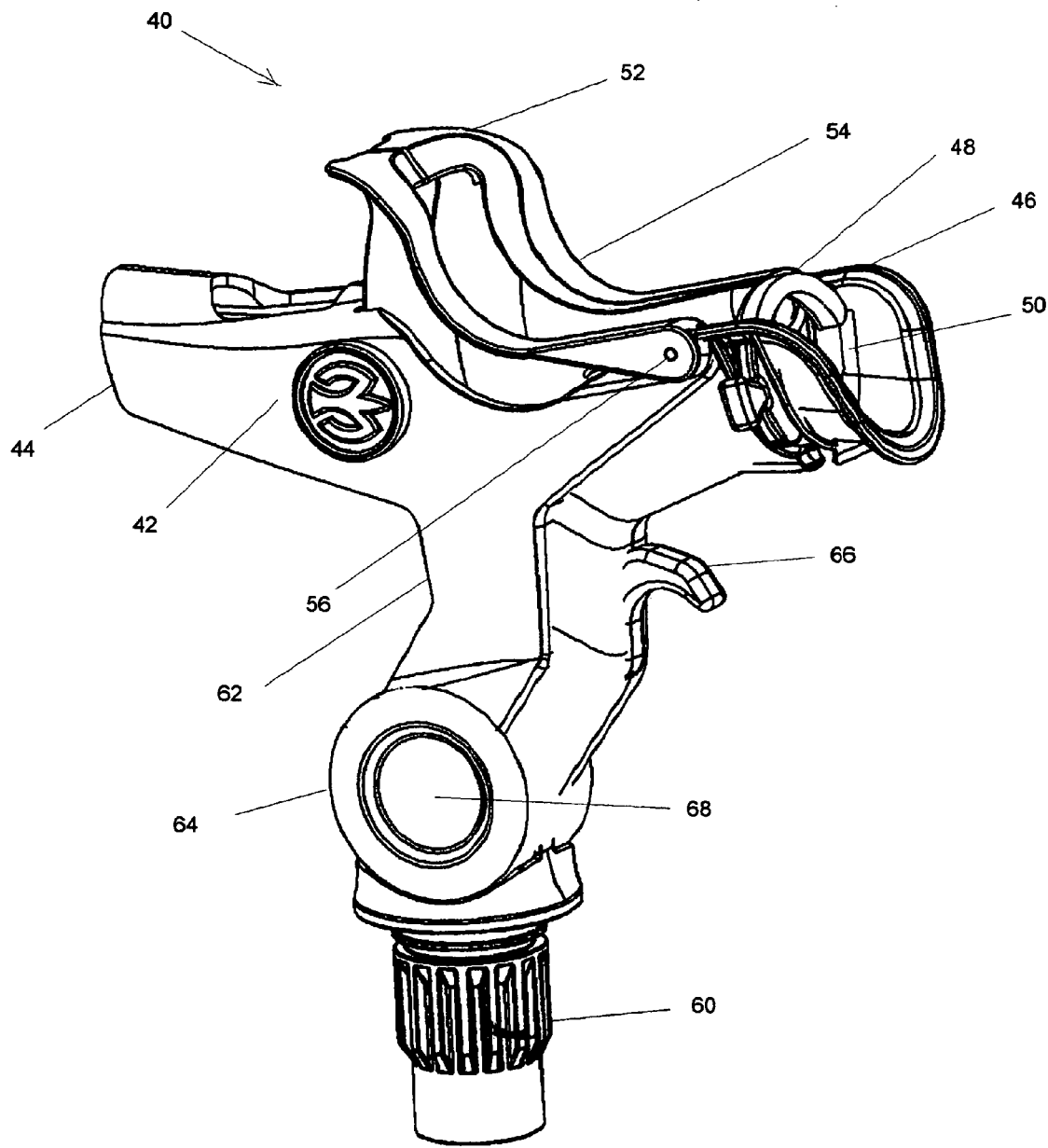
FIG. 3 is an isometric view of a stabilized, adjustable rod holder, according to the invention.
Figure 4:
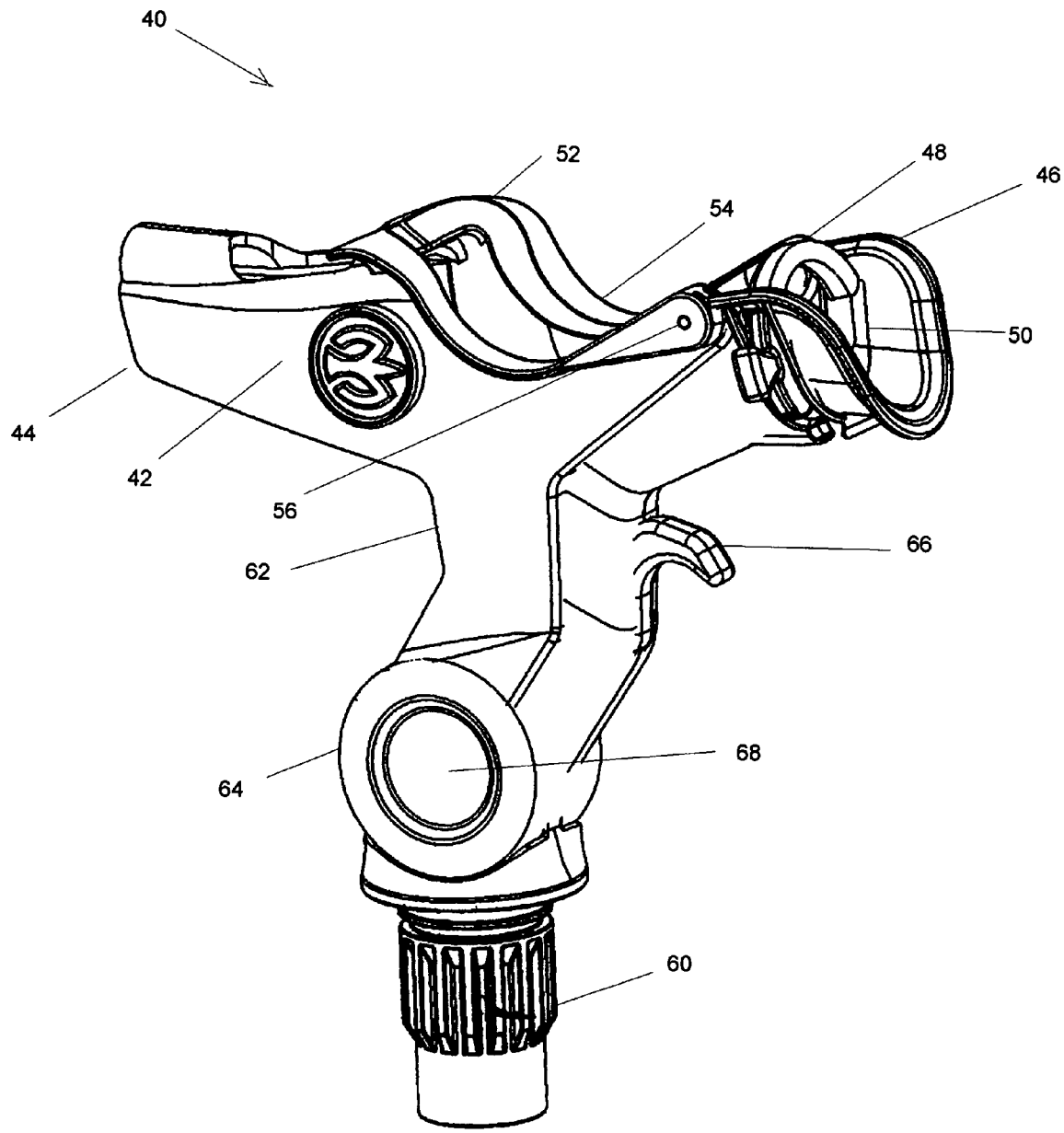
FIG. 4 is an isometric view of a stabilized, adjustable rod holder with the stabilizer in a depressed condition, according to the invention.
Figure 5:
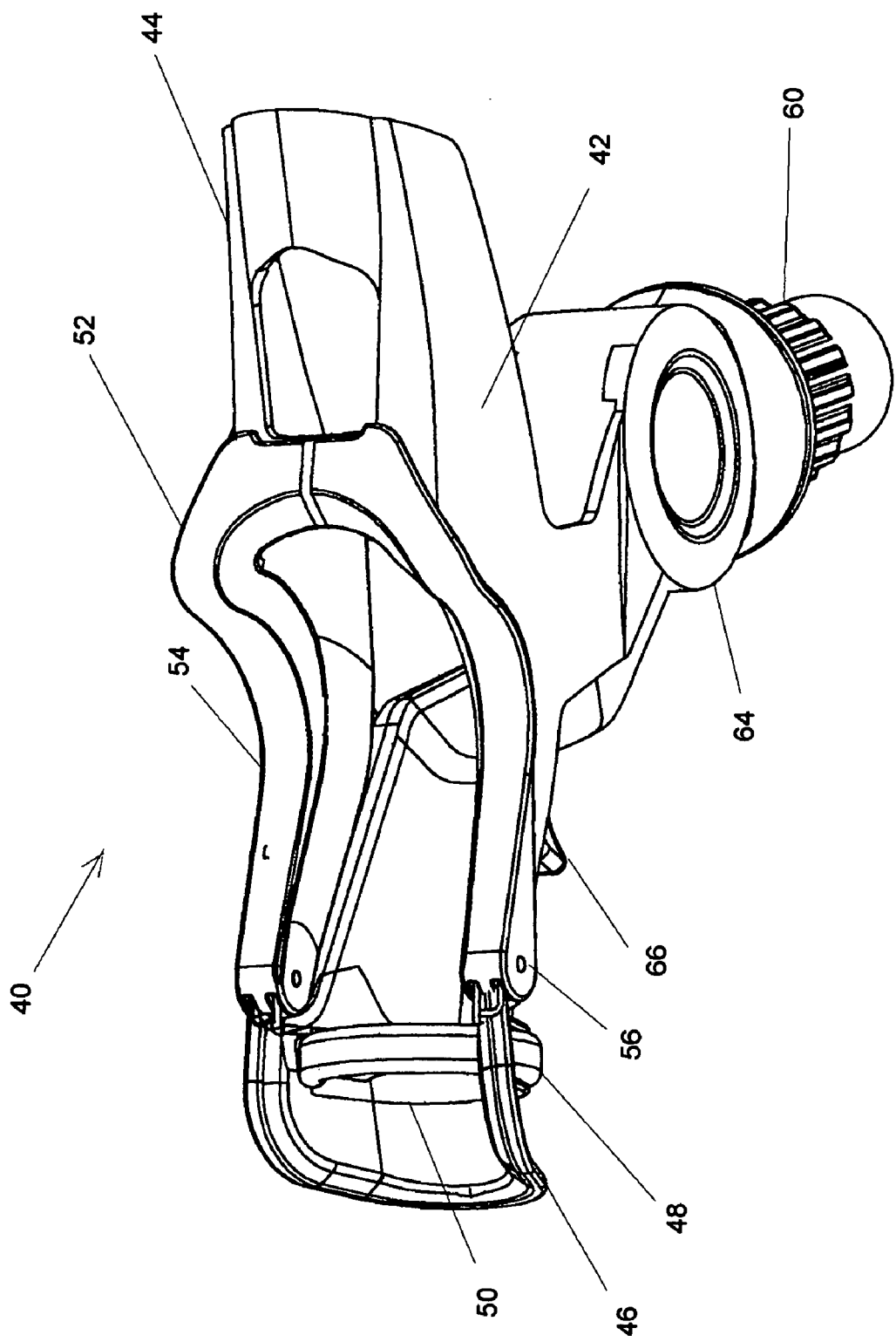
FIG. 5 is a top elevational view of a stabilized, adjustable rod holder, according to the invention.

FIGS. 3 and 4 show side elevation views and FIG. 5 shows a top elevation view of a rod holder 40 embodying features of the invention that is configured to receive and secure a rod 10 and reel 16 combination such as that shown in FIG. 1. Rod holder 40 generally comprises a tubular holster 42 sized to receive common ranges of rod butt diameters. As shown, the aft portion 44 of holster 42 has the bottom cut away to allow the rod 10 to pivot upwards and be easily removed from holder 40. The fore portion 46 of holster similarly has the top cut away, so that the rod 10 can pivot upwards for removal. Aft portion 44 and fore portion 46 are configured to engage the aft and fore grips 22 and 20, respectively, of a rod 10.

Figure 2:
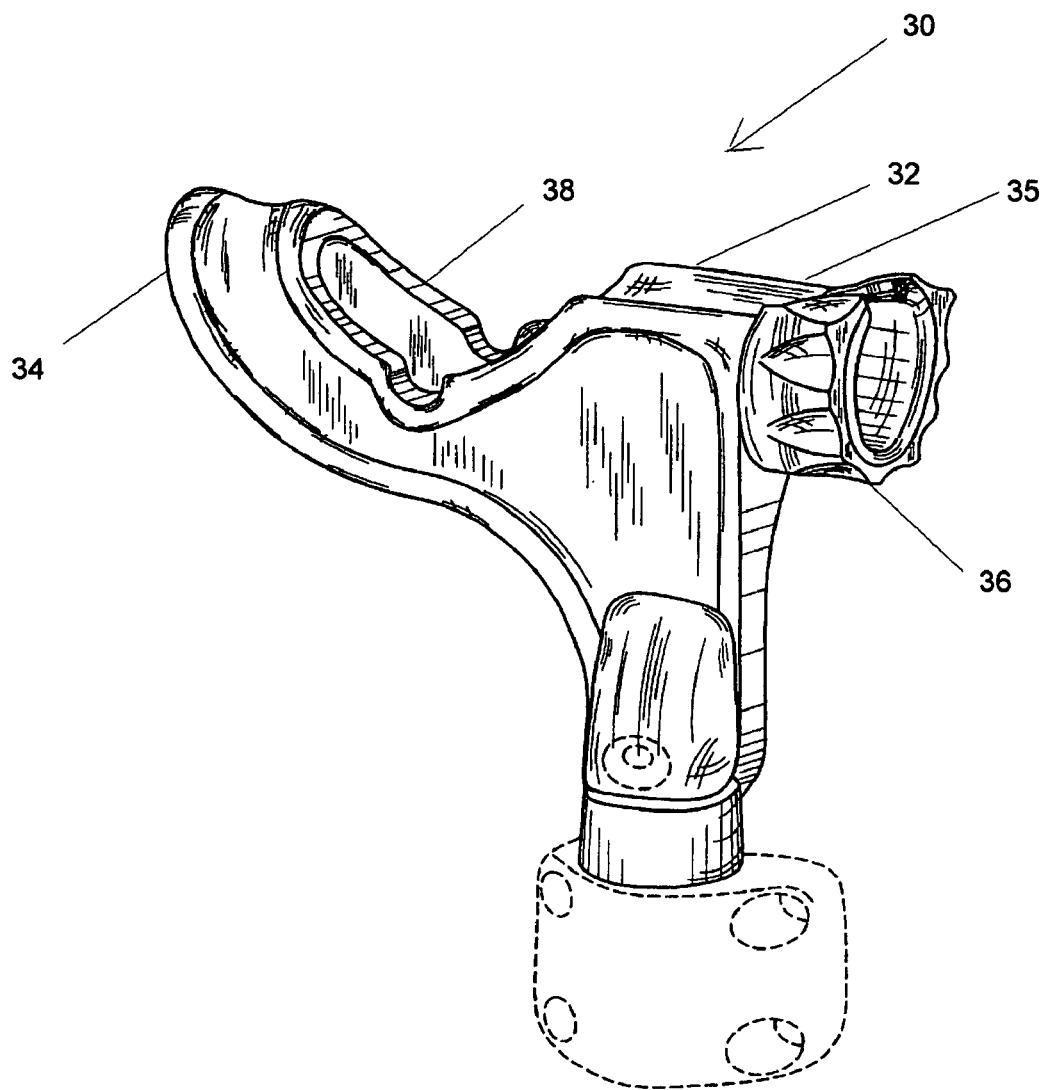
FIG. 2 is an elevational view of a prior art rod holder.

Fore portion 46 further incorporates a rotating, locking bail 48 in the form of a semicircular ring. The housing of holster 42 has a race 50 configured to accept bail 48, allowing it to rotate between closed and open positions. Thus, when rod 10 is placed within holder 40, bail 48 can be rotated to the closed position to secure rod 10 within holder 40. As can be seen, race 50 supports bail 48 in fore and aft directions, resisting shear forces on the bail. This allows the size of bail 48 to be minimized, providing easier and less obtrusive operation. In contrast, prior art rod holders such as the one shown in FIG. 2 incorporate a locking bail in the form of a ring that is positioned on the outside diameter of the holder. In such cases, the bail must be bulkier to provide adequate strength since the housing does not support it.

Rod holder 40 features a pivoting stabilizer 52 having opposing curved portions 54 generally corresponding to the conventional diameters of reel 16. Stabilizer 52 exhibits a range of travel configured to accommodate a wide variety of rod and reel combinations. FIG. 3 shows stabilizer 52 in its raised position, while FIG. 4 shows stabilizer 52 in its depressed position. Preferably, stabilizer 52 is spring loaded or otherwise biased towards the raised position and pivots on axle 56. Thus, regardless of the size and configuration of the rod 10 and reel 16, stabilizer 52 is urged into contact with reel 16 when rod 10 is positioned within holder 40. Accordingly, stabilizer 52 counteracts the tendency of rod 10 to rotate axially due to the weight of reel 16. Similarly, stabilizer 52 also minimizes the longitudinal movement of rod 10 that might occur due to vibration, rough sea conditions or other forces.

The interaction of stabilizer 52 and reel 16 is also preferably configured to occur at areas of the reel 16 most removed from the operable portions of the reel, allowing the reel to used without interference.

As shown in FIG. 5, the fore portion 46 of holster 42 is preferably configured with total relief to provide clearance for trigger 24 of rod 10, if so equipped. Accordingly, varying placement and size of the trigger will not interfere with the ability of rod holder 40 to secure and stabilize the rod and reel combination. In contrast, prior art rod holder designs often feature a cutout for the trigger, so that the trigger engages the housing of the rod holder. Therefore, the cutout must be precisely positioned to accept the trigger. In such designs, this creates an additional area where variability in rod and reel configuration can lead to inefficient or inadequate operation of the holder.

As discussed above, stabilizer 52 has a range of travel configured to accommodate most rod and reel combinations. As one having skill in the art will appreciate, the diameter of rod 10 at butt 18 is typically in the range of approximately 26-38 mm and more typically in the range of 28-36 mm. Further, depending upon the configuration, the outer circumference of the reel 16 can be positioned somewhere between flush with the centerline of the rod diameter and flush with the outer diameter of the rod. Thus, the range of travel of stabilizer 52 is preferably approximately half the maximum expected diameter of rod 10. In one embodiment, the range of travel where the reel 16 contacts stabilizer 52 is in the range of approximately 15-25 mm, and in a preferred embodiment, the range of travel is approximately 19 mm.

Accordingly, a rod holder 40 equipped with pivoting stabilizer 52 can accommodate a wide range of rod and reel combinations. In situations where the reel is mounted so that its circumference is approximately flush with the outer diameter of the rod, stabilizer 52 is biased towards its raised position, shown in FIG. 3, so that stabilizer 52 contacts and supports reel 16. The main loading forces of the rod are carried by fore and aft portions 44 and 42 of holder 40. Alternatively, in situations where the reel is mounted with its circumference approximately flush with the center line of a large diameter rod, the weight of the rod and reel depresses stabilizer 52 to the position shown in FIG. 4. Thus, the main loading forces of the rod are still carried by the engagement of holder 40 with the grip areas 20 and 22 of rod 10, yet stabilizer 52 remains in contact with reel 16 to support it.

Rod holder 40 also preferably includes a splined insert member 60 that is configured for use with a universal mount. Details regarding universal mounting systems with accessories having insert members are described in U.S. Provisional Patent Application Ser. No. 60/842,794, filed Sep. 6, 2006, co-pending U.S. application Ser. No. {to be assigned}, filed Jul. 2, 2007, entitled "Universal Mounting System," and co-pending U.S. application Ser. No. {to be assigned}, filed Jul. 2, 2007, entitled "Accessories for Universal Mounting System," each of which are incorporated in their entirety by reference. In other embodiments, rod holder 40 can comprise any suitable attachment mechanism to secure rod holder 40 to a rail, gunnel, or any other convenient surface.

As shown in FIGS. 3 and 4, the upper portion of rod holder 40 comprises an arm 62 with a rotating joint 64 at the end of arm 62 adjacent insert member 60. Trigger 66 operates to adjust the orientation of rotating joint 64 between a plurality of desired angles.

Conventional rod holders that exhibit pivoting motion use a joint located adjacent the butt of the rod. Although it is easier to design a holder with sufficient strength using this configuration, the rod cannot be placed in a vertical orientation due to interference between the butt of the rod and the mounting surface when the holder is mounted on a gunnel or similar surface.

As shown in FIGS. 3 and 4, placement of rotating joint 64 away from holster 42 displaces the longitudinal axis of the rod from the base of the rod holder. Accordingly, a rod 10 disposed in holster 42 can be placed in a vertical position without running into the gunnel or other mounting surface. Generally, the rod holder is mounted approximately on the center line of the gunnel, so the length of arm is preferably greater than about one half the gunnel width. Since many gunnels range in width from approximately 10 cm to 40 cm, in one embodiment, the arm is in the range of approximately 5 cm to 20 cm, and more preferably approximately 10 cm to 15 cm. With wider gunnels, the rod holder can be mounted inboard from the center line so as to still achieve adequate clearance for the butt of the rod in the vertical position.

Further, this design leaves a large area on arm 62 to incorporate trigger 66, allowing easy adjustment with or without the rod. Specifically, it allows the operator to grab the front of the rod with one hand and rod holder 40 with the other hand at the same time. If a fish is on the rod, the operator can pull the trigger to allow joint 64 to pivot and pull back on the rod and rod holder 60 simultaneously to set the hook and get the rod into a fighting position. Rod holder 40 can also be positioned to allow easy removal of the rod.

As described and shown in more detail in the related provisional application incorporated above, trigger 66 actuates a spring-loaded locking member that engages indexed recesses in the base of rotating joint 64. Arm 62 is pivotally attached to rotating joint 64 by axle 68. The indexed recesses are spaced radially around the axis formed by axle 68. This allows trigger 66 to be mechanically aligned in the plane of rotation, so that trigger 66 can be ergonomically placed to allow actuation while the user's hands are positioned to hold rod 10 in rod holder 40. In contrast, the prior art rod holders described above typically adjust the pivot angle by using two mating faces with a screw or tightening device to hold the faces in matable contact with one another. Such devices are consequently oriented along the axis of the pivoting axle, requiring the user to remove one or both hands from their desired positions along the rod or rod holder to operate it.

As discussed above, positioning axle 68 relatively near the attachment point of the holder 40, either universal spline insert member 60 or another suitable mechanism, creates a long lever arm 62 that clears the gunnel or other mounting surface when holster 42 is rotated back to a vertical position. This vertical position is ideal for storing the rod in a nonoperating position and negates the need for more traditional storage rod holder that are common and obtrusive in most fishing boats. Accordingly, rod holder 40 functions as both a rod holder for active fishing and a storage holder.

Rod holder 40 preferably has the indexed rotational adjustments configured for most applications, including side gunnel mount, transom mount and vertical storage. The design of the locking mechanism allows simple adjustment between these positions with a rod in holder 40 with no danger of the rod holder or rod falling during adjustment. Further, the positive locking feature prevents holder 40 from rotating into a forward position to minimize the chance of the rod slipping out and being lost.

Figure 6:
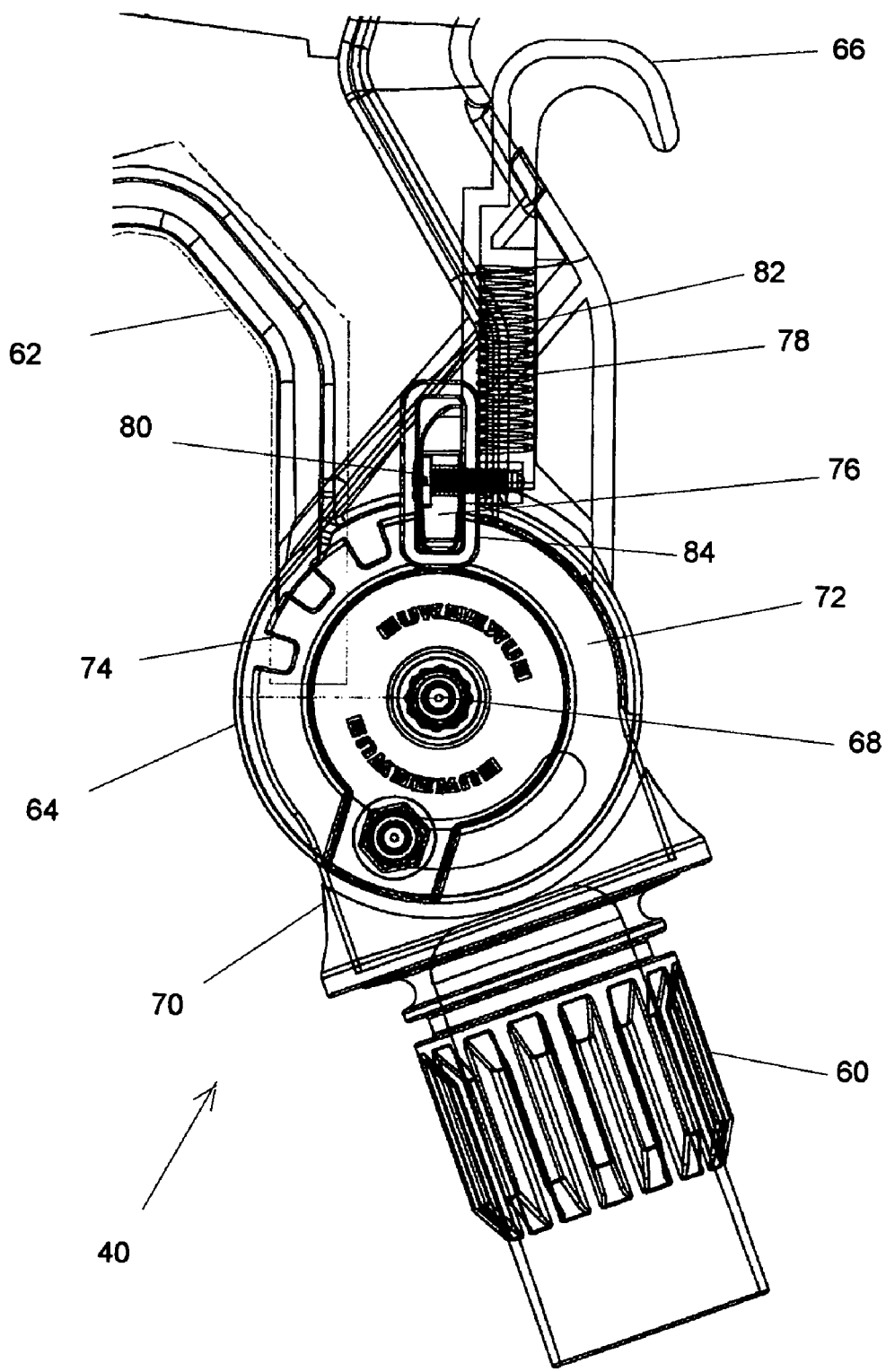
FIG. 6 is a detail view, partially in section, showing the indexing mechanism of a stabilized, adjustable rod holder, according to the invention.

FIG. 6 is a partial, transparent view in elevation of a rod holder 40, showing further details of one embodiment of the indexed rotational adjustment mechanism. Base 70 includes splined insert member 60 and forms the bottom of joint 64. Plate 72 extends from base 70 in a plane perpendicular to axle 68 and includes indexed recesses 74. Locking member 76 is secured to rod 78 by screw 80. Rod 78 is in turn linked to trigger 66. Spring 82 urges locking member 76 against plate 72, and likewise, into indexed recess 74 when arm 62 is in a corresponding rotational alignment. Operation of trigger 66 compresses spring 82 and withdraws locking member 76 from indexed recesses 74 to allow rotational movement of arm 62 with respect to base 70. As can be seen, locking member travels along a substantially radial path with respect to axle 68, which provides the strength and convenience advantages described above in comparison to conventional rod holder designs that involve a tightening of surfaces in an axial direction.

Preferably, locking member 76 extends transversely through the housing of arm 62, so that it lies approximately flush with the outer surface of arm 62. Openings 84 in the housing of arm 62 receive the ends of locking member 76. Openings 84 are configured to allow movement of locking member perpendicular to axle 68 between open and locked positions. Openings 84 closely fit the width of locking member 76 so that rotational forces are transmitted directly to arm 62. As can be appreciated, this forms a very robust and secure connection when locking member 76 is engaged with one of indexed recesses 74. Preferably, locking member 76 has a wedge-shaped configuration and indexed recesses 74 have matching tapers, so that locking member 76 automatically contacts both surfaces of indexed recess 74 and prevents rotational play.

Figure 7:
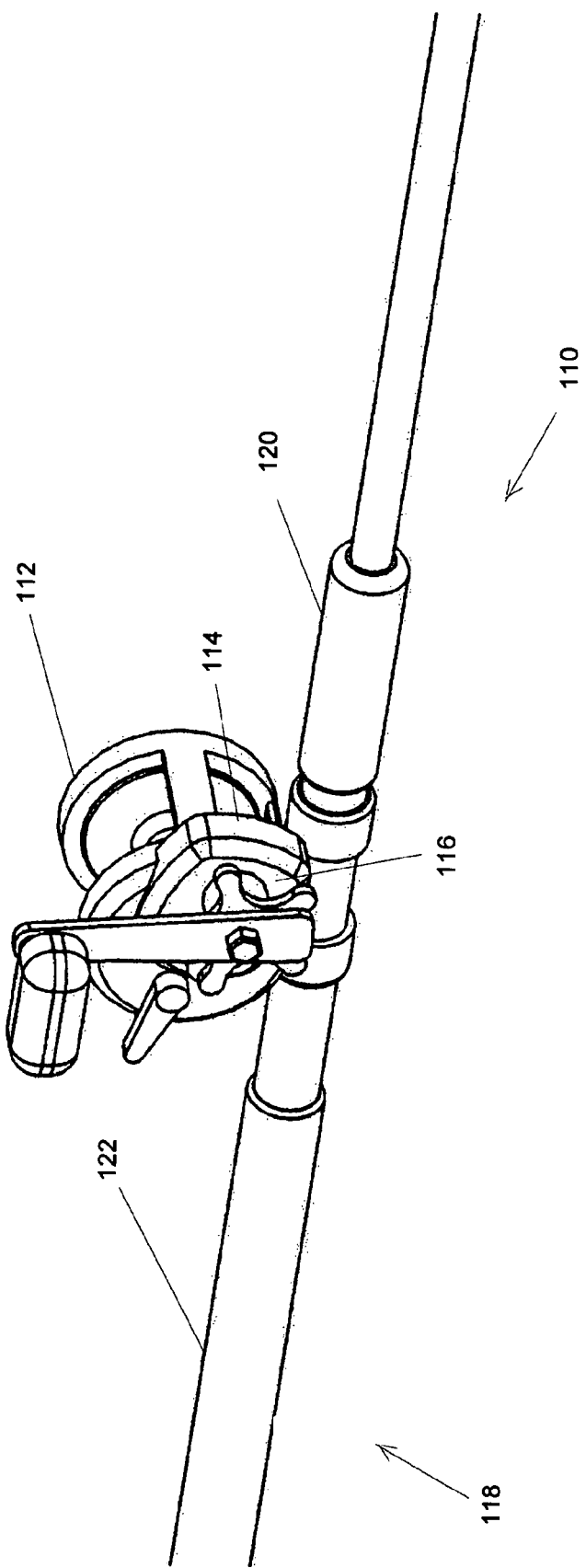
FIG. 7 is an isometric view of a rod with a geared reel.

Turning now to FIG. 7, a fishing rod 110 (partially shown) is equipped with a geared reel 112. As known to those of skill in the art, a popular type of fishing reel incorporates a geared transmission to speed the winding of line with the reel. Typically, these reels offer the user the gear ratios such as 1:6 or 1:8. As such, geared reel 112 must have housing 114 that can accommodate a transmission 116. As shown in FIG. 7, housing 114 often has a relatively flat portion at the bottom of transmission 116 that generally aligns with the outer diameter of rod 110. If the housing were to project beyond this point, the reel would not be as effective ergonomically. Rod 110 typically includes butt 118 equipped with fore and aft grips 120 and 122, respectively, to facilitate holding the rod and to provide good leverage. Rod 110 may also be equipped with a trigger (not shown) to help the user hold the rod.

Figure 8:
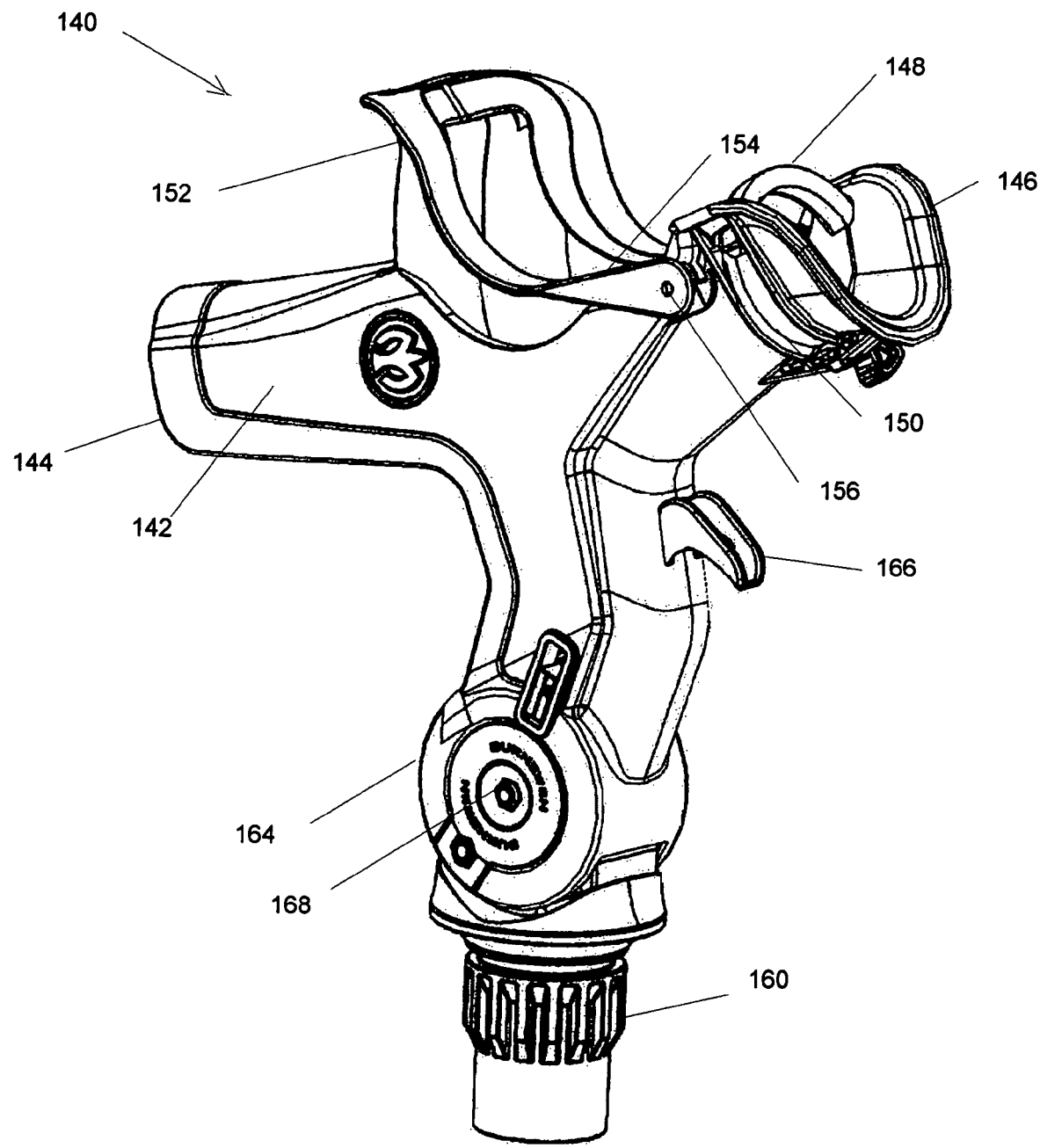
FIG. 8 is an isometric view of an alternate embodiment of a stabilized, adjustable rod holder configured for geared reels, according to the invention.
Figure 9:
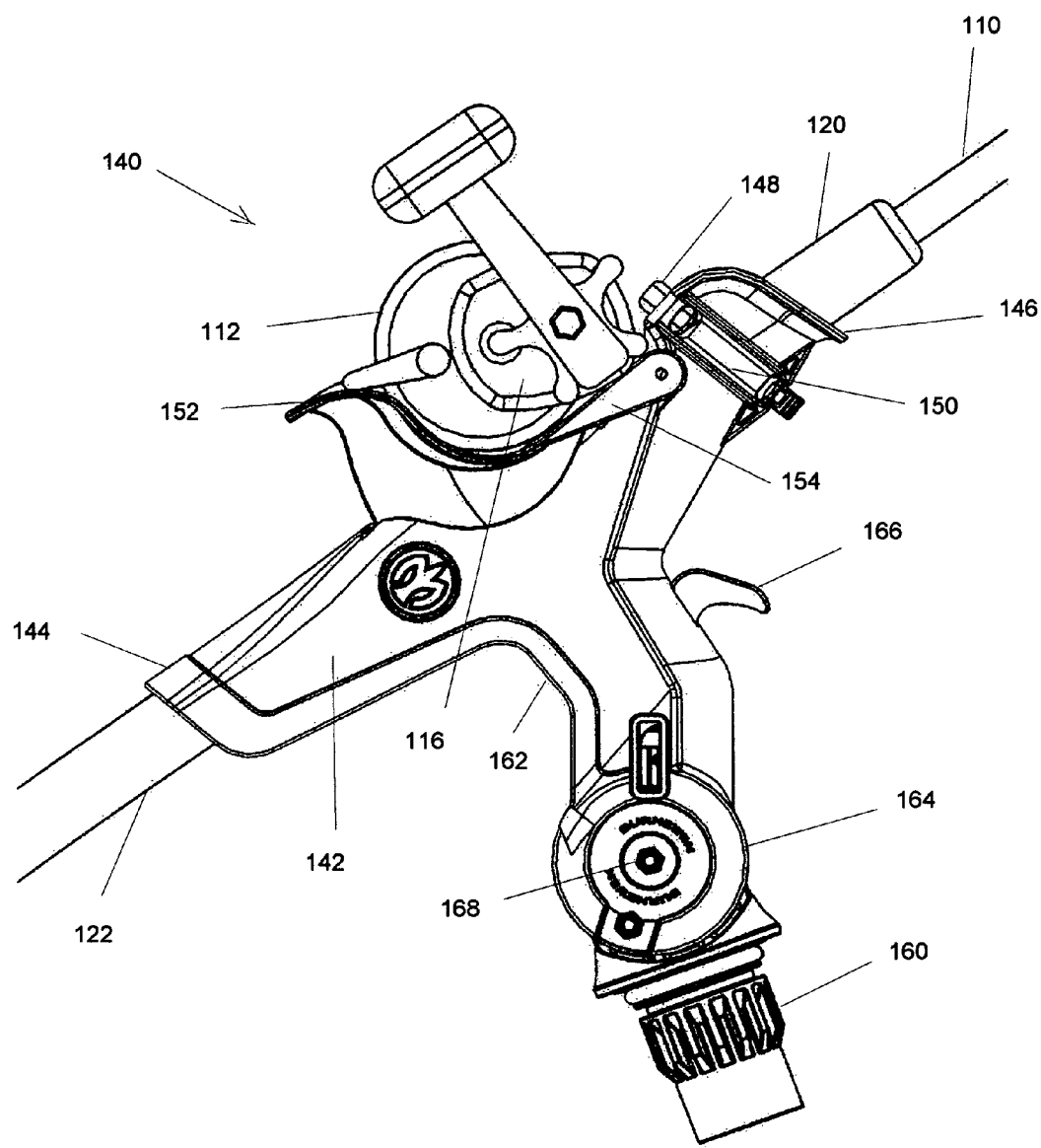
FIG. 9 is an isometric view of an alternate embodiment of a stabilized, adjustable rod holder configured for geared reels, with a rod being held, according to the invention.

Although rod holder 40 will effectively stabilize rod 110 and reel 112, the design of pivoting stabilizer 52 is not optimized for reels having a transmission. Thus, another embodiment of the invention is shown in FIGS. 8 and 9, in which the pivot point of the stabilizer has been lowered relative to the longitudinal axis of the holder to better accommodate geared reels, such as reel 112. Specifically, FIG. 8 shows an isometric view of rod holder 140, which generally comprises a tubular holster 142 sized to receive common ranges of rod butt diameters. As shown, the aft portion 144 of holster 142 has the bottom cut away to allow the rod 110 to pivot upwards and be easily removed from holder 140. The fore portion 146 of holster similarly has the top cut away, so that the rod 110 can pivot upwards for removal. Aft portion 144 and fore portion 146 are configured to engage the aft and fore grips 122 and 120, respectively, of a rod 110.

Fore portion 146 further incorporates a rotating, locking bail 148 in the form of a semicircular ring. The housing of holster 142 has a race 150 configured to accept bail 148, allowing it to rotate between closed and open positions. Thus, when rod 110 is placed within holder 140, bail 148 can be rotated to the closed position to secure rod 110 within holder 140.

Rod holder 140 features a pivoting stabilizer 152 having substantially flat portions 154 on opposing sides of the holder. Stabilizer 152 exhibits a range of travel configured to accommodate a wide variety of rod and reel combinations. FIG. 9 shows rod holder 140 with rod 110 and reel 112 supported and secured. When stabilizer 152 is depressed by the interaction with reel 112, flat portions 154 are preferably substantially parallel with the longitudinal axis of rod holder 140, and thus, rod 110. As can be seen, flat portions 154 conform to transmission 116 of reel 112.

Preferably, stabilizer 152 is spring loaded or otherwise biased towards the raised position and pivots on axle 156. Thus, regardless of the size and configuration of the rod 110 and reel 112, stabilizer 152 is urged into contact with reel 112 when rod 110 is positioned within holder 140. Accordingly, stabilizer 152 counteracts the tendency of rod 110 to rotate axially due to the weight of reel 112. Similarly, stabilizer 152 also minimizes the longitudinal movement of rod 110 that might occur due to vibration, rough sea conditions or other forces.

The interaction of stabilizer 152 and reel 112 is also preferably configured to occur at areas of the reel 112 most removed from the operable portions of the reel, allowing the reel to used without interference.

Rod holder 140 preferably includes a splined insert member 160 as described above. In other embodiments, rod holder 140 can comprise other suitable attachment mechanisms to secure rod holder 140 to a rail, gunnel, or any other suitable surface. Rod holder 140 further comprises an arm 162 with a rotating joint 164 at the end of arm 162 adjacent insert member 160. Trigger 166 operates to adjust the orientation of rotating joint 164 between a plurality of desired angles.

Figure 10:
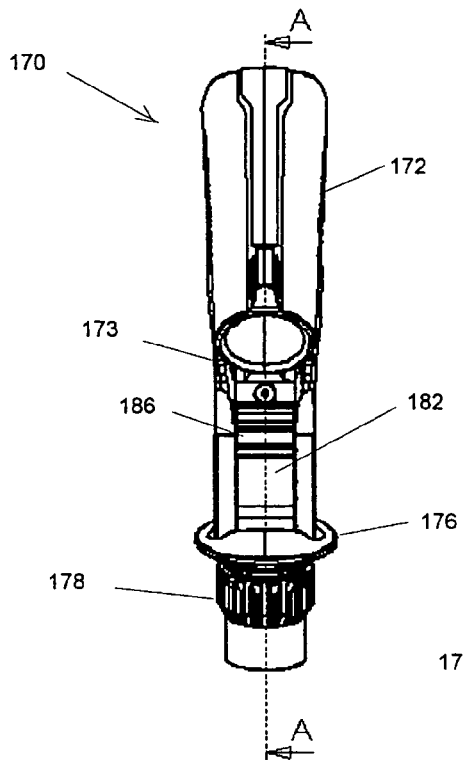
FIG. 10 is a side view of an alternate embodiment of an adjustable rod holder, according to the invention.
Figure 11:
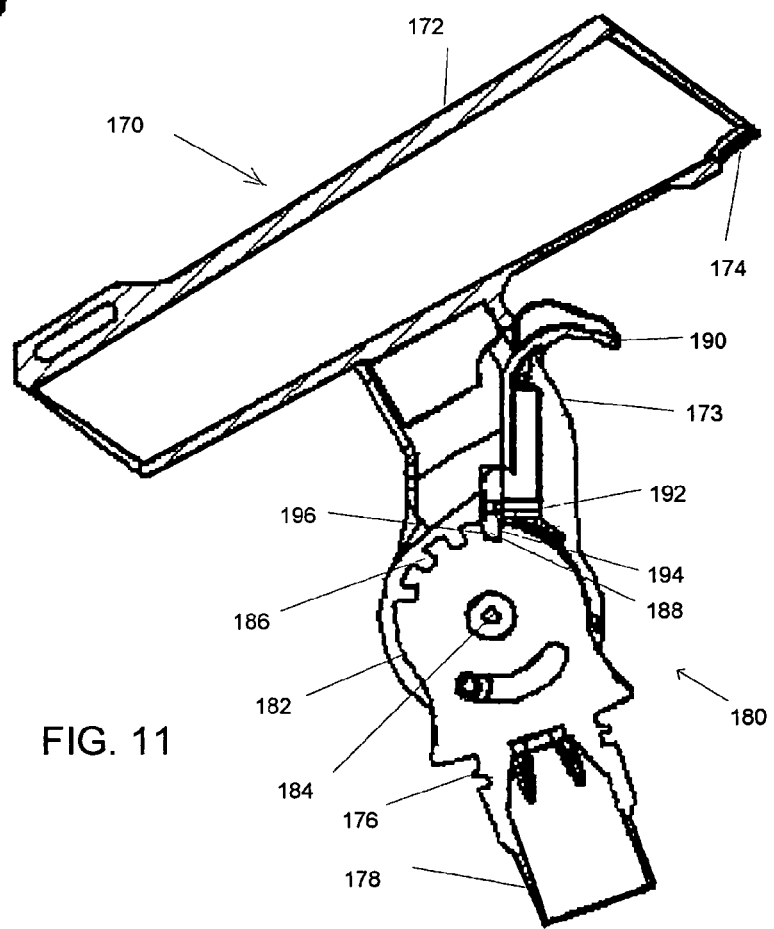
FIG. 11 is a cross sectional view of the rod holder shown in FIG. 10, taken at line A-A.

Another aspect of the invention is shown in FIGS. 10 and 11, which illustrate a side view of tubular style rod holder 170 and a cross section taken at A-A, respectively. FIG. 10 shows a rod holder 170 having a primarily tubular holster 172 configured to retain the butt 18 of a rod. Holster 172 is carried by arm 173. As desired, a recess 174 in the cylinder of holster 172 accommodates the trigger 24 of a rod to increase the stability of the system. The base 176 of holder 170 preferably includes splined insert member 178 and forms the lower portion of joint 180. Alternatively, base 176 can feature other mounting mechanisms if desired. Plate 182 extends from base 176 in a plane perpendicular to axle 184 and includes indexed recesses 186. Locking member 188 is operatively connected trigger 190. Spring 192 urges locking member 188 against plate 182, and likewise, into indexed recess 186 when arm 173 is in a position that provides the correct alignment. Pulling upwards on trigger 190 compresses spring 192 and withdraws locking member 188 from indexed recesses 186 to allow rotational movement of arm 173 with respect to base 176.

The embodiment shown in FIG. 11 differs from the embodiment shown in FIG. 6 in that indexed recesses 186 feature one side that have a negative rake angle in order to minimize the potential of locking member 188 from unintentionally disengaging from the recess. Specifically, recess 186 features one face 194 that exhibits a slight negative angle with respect to the radial direction of travel of locking member 188. In the embodiment shown, the angle is approximately −5°, although other angles can be used, such as approximately −1° to −15°. In the embodiment shown opposing face 196 has an angle of approximately 15°, although other angles in the range of approximately 1° to 30° can be used. The opposing face 196 preferably exhibits a positive rake angle greater than the negative rake angle, so that recess 186 still has a tapered profile, ensuring that wedge shaped locking member 188 securely engage a relatively large area of both faces. It is also preferable that the angles of faces 194 and 196 not be too great, positively or negatively, so that movement of locking member 188 into and out of recess 186 is not unduly hindered.

As can be appreciated, when a rod holder is in use, varying loads are being transmitted through the rod to the holder. These cause arm 173 to rock back and forth against base 176. A positive rake angle between the locking member 188 and the recess 186 translates some of the rotational movement into a force away from axle 184, urging the locking member 188 out of recess 186. If both faces exhibit a positive rake angle, it is possible for the repeated rocking motion to essentially "walk" the locking member 188 out of recess 186. By providing one of the faces with a negative rake angle, rotational movement towards that face instead translates force towards axle 184, helping seat locking member 188 in recess 186. Thus, a negative rake angle on one face effectively counteracts the tendency for locking member 188 to disengage recess 186.

Additionally, as described above, the rod holders of the invention are not limited to uses on a boat, but can be employed with any other vehicle or structure that presents a suitable mounting area.

Described herein are presently preferred embodiments, however, one skilled in the art that pertains to the present invention will understand that there are equivalent alternative embodiments. As such, changes and modifications are properly, equitably, and intended to be, within the full range of this disclosure.

What is claimed is:

1. An adjustable rod holder comprising a tubular holster having a longitudinal axis mounted to an arm, a base, and a trigger release affixed to the arm, wherein the arm is secured to the base by a rotating joint having an axle allowing rotation in opposing directions that is secured in a first angular position against rotational movement in each of the opposing directions by a locking member that engages the base when the trigger release is free and that moves when the trigger release is actuated, wherein the trigger release and the locking member are linked by and positioned at opposing ends of a connector, wherein the trigger release is positioned on the arm between the tubular holster and the rotating joint, wherein the longitudinal axis of the tubular holster is not collinear with the axle of the rotating joint and wherein the trigger release is actuated by applying to the trigger release a force parallel to a radial movement of the locking member towards the longitudinal axis of the tubular holster in a same relative direction as the radial movement of the locking member.

2. The adjustable rod holder of claim 1, wherein the rotating joint can be releasably secured at a plurality of indexed angular positions.

3. The adjustable rod holder of claim 2, wherein the rotating joint is releasably secured at an indexed position by the locking member that fits within a plurality of recesses in the base spaced radially about the axle of the rotating joint.

4. The adjustable rod holder of claim 3, wherein actuating the trigger release by moving the trigger release towards the longitudinal axis of the tubular holster disengages the locking member and allows the rotating joint to pivot freely.

5. The adjustable rod holder of claim 4, wherein actuation of the trigger release withdraws the locking member from one of the plurality of recesses.

6. The adjustable rod holder of claim 3, wherein at least one of the plurality of recesses exhibits a tapered profile.

7. The adjustable rod holder of claim 6, wherein the locking member has a wedge shaped profile configured to mate with the tapered profile of the at least one of the plurality of recesses.

8. The adjustable rod holder of claim 7, wherein the at least one of the plurality of recesses is defined by opposing faces and wherein one of the opposing faces has a negative rake angle.

9. The adjustable rod holder of claim 8, wherein an other of the opposing faces has a positive rake angle with a greater absolute value than an absolute value of the negative rake angle.

10. The adjustable rod holder of claim 1, wherein the arm is configured to allow a rod secured within the rod holder to be positioned vertically when the rod holder is mounted to a gunnel.

11. The adjustable rod holder of claim 10, wherein the arm has a length in the range of approximately 5 cm to 20 cm.

12. The adjustable rod holder of claim 1, wherein the base further comprises a lower portion that is substantially cylindrical and has an outer diameter configured to be received by an interior diameter of a barrel of a universal mount.

13. The adjustable rod holder of claim 12, wherein the lower portion has a plurality of splines aligned with a longitudinal axis of the lower portion.

14. The adjustable rod holder of claim 13, wherein the splines are configured to interlock with a plurality of splines disposed around the interior diameter of the barrel of the universal mount.

15. The adjustable rod holder of claim 1, wherein the tubular holster comprises an aft portion and a fore portion configured to secure a fishing rod and a pivoting stabilizer, wherein the aft portion has a bottom opening and the fore portion has a top opening that allow the fishing rod positioned in the rod holder to pivot upwards and wherein the pivoting stabilizer is configured to contact and support a reel secured to the rod when the rod is positioned in the rod holder by having a pivoting axis substantially perpendicular to the longitudinal axis of the tubular holster.

16. The adjustable rod holder of claim 15, wherein the pivoting stabilizer has opposing curved portions configured to conform to a diameter of the reel.

17. The adjustable rod holder of claim 15, wherein the pivoting stabilizer is elastically biased in an upwards direction.

18. The adjustable rod holder of claim 15, wherein the pivoting stabilizer exhibits a range of travel at a location where the stabilizer contacts the reel in the range of approximately 15 to 25 mm.

19. The adjustable rod holder of claim 18, wherein the pivoting stabilizer exhibits a range of travel at a location where the stabilizer contacts the reel of approximately 19 mm.

20. The adjustable rod holder of claim 15, wherein the pivoting stabilizer has opposing flat portions configured to conform to a housing of the reel.

21. The adjustable rod holder of claim 20, wherein the flat portions are configured to be substantially parallel to the longitudinal axis of the holster when the pivoting stabilizer is in a depressed position.

* * * * *